Aug. 11, 1964
A. W. BRUECKNER
3,143,882
FLUID TRANSDUCER
Filed Oct. 27, 1960
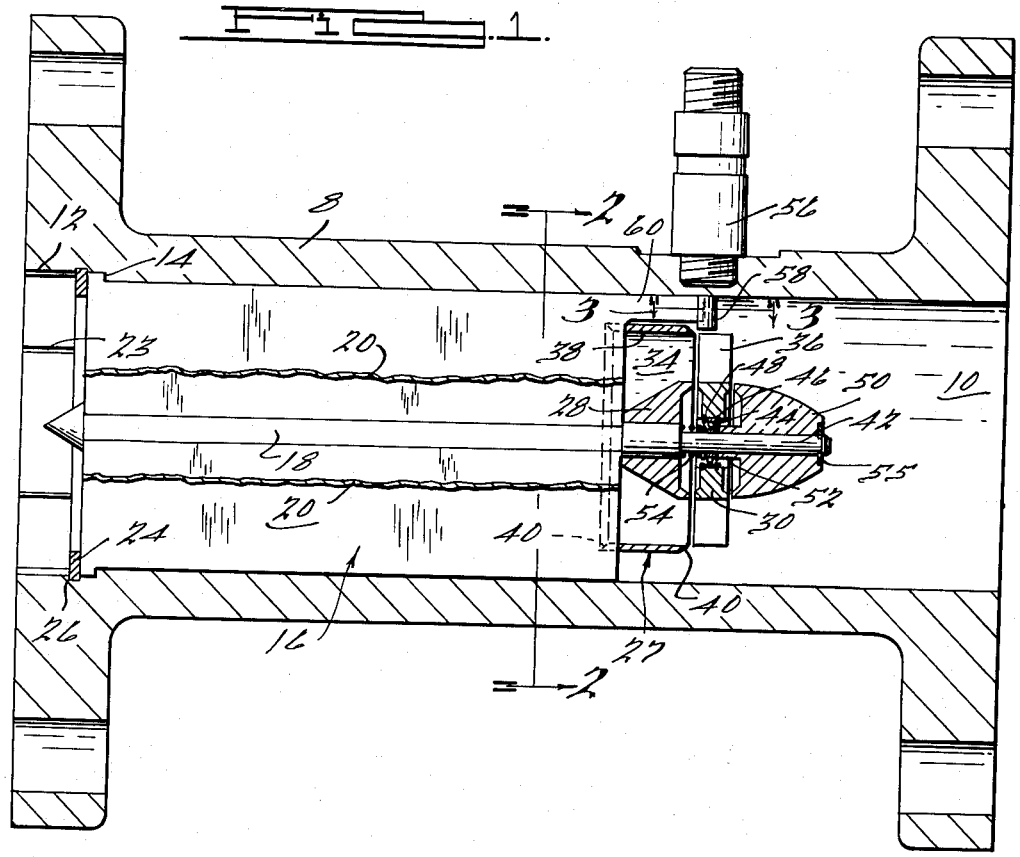
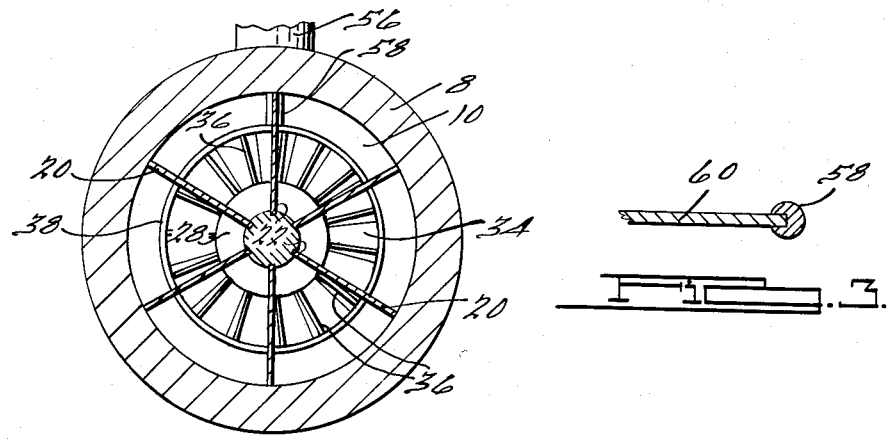
INVENTOR.
Alexander W. Brueckner
BY
Harness, Dickey & Pierce
ATTORNEYS

3,143,882
FLUID TRANSDUCER
Alexander W. Brueckner, Farmington, Mich., assignor, by mesne assignments, to Lynch Corporation, Anderson, Ind., a corporation of Indiana
Filed Oct. 27, 1960, Ser. No. 65,433
8 Claims. (Cl. 73—231)

The present invention relates to flowmeters and more particularly to flowmeters having large diameter bores.

When a flowmetering device is inserted in a fluid conduit to measure the velocity of fluid conduit to measure the velocity of fluid flow therein, it is desirable that the bore of the flowmetering device be at least as large as the conduit in order to avoid excessive pressure drops across the flowmetering device. However, if conventional flowmetering devices are simply enlarged to scale in order to produce a device suited for association with a large diameter conduit, the resultant increase in the mass of the rotor tends to affect the relation between the velocity of the fluid and the rotational velocity of the rotor, thereby introducing nonlinearity. Furthermore, the effect of the increase in the linear velocity of the tip of the rotor blade resulting from the use of a larger diameter rotor which rotates at the same or substantially the same rotational velocity as the smaller rotor, tends to stress the rotor and the rotor bearings in a manner not conducive to adequate operational performance or life. Accordingly, it is normally necessary to redesign rotors to either increase their strength (and mass) or to change the pitch of the blades to reduce the effective rotational velocity. In the former case, nonlinearity tends to be introduced, and in the latter case, the number of blades provided must normally be increased in order to provide a sensible output signal having an adequately high frequency. In either case, it is normally necessary to separately design the rotor for each size of flowmetering device.

In accordance with the principles of the present invention, flowmetering devices for association with relatively large conduits are formed with bores substantially equal to the diameter of the conduit, but the diameter of the rotor is small relative to the diameter of the bore. In this manner, the above noted problems are avoided and the manufacturer is enabled to use the same rotor assembly wtih a plurality of different size flowmeter housings.

Several problems arise when a small diameter rotor is utilized in a large diameter bore. Firstly, means must be provided to divert the fluid flowing in the large diameter bore through the small diameter rotor. Otherwise, a substantial amount of the flowing fluid will bypass the small diameter rotor thereby causing an erratic metering effect. Furthermore, special consideration in designing the diverter means is necessary since at high flow rates the diverted flow will have a substantial radial component causing the fluid flow to pass radially outward so as to strike only the top portion of the rotor blades. Shroud means can be provided at the fluid flow diverter to redirect the fluid flow at high velocities so that it is primarily longitudinal at the rotor vanes. Such redirection also directs the fluid flow uniformly across the radial length of the rotor blade. A final problem in using small diameter rotors in a large diameter bore arises since the tip portion of the rotor is located a substantial distance away from a sensing unit mounted in the wall of the bore. Thus a gap of large reluctance exists between the sensing unit and the rotor thereby reducing the effectiveness of the sensing unit. In accordance with certain of the principles of the present invention, means are provided for reducing the reluctance of the sensing magnetic circuit.

The present invention is directed towards a large diameter bore flowmeter having a small diameter rotor therein along with unique improvements which overcome the aforesaid problems.

Therefore, an object of the present invention is to use a relatively small diameter rotor in conjunction with a large diameter bore.

Another object of the invention is to establish a proper sensing relationship between a small diameter rotor and a sensing unit mounted in the wall of a housing having a large diameter bore.

Still another object of the invention is to direct fluid flow in a longitudinal direction uniformly across the radial length of rotor blades on a small diameter rotor mounted in a large diameter bore.

The manner of accomplishing the foregoing objects and other objects and features of the invention will become apparent from the following detailed description of embodiments of the invention when read with reference to the accompanying drawings in which:

FIGURE 1 shows a cross-section of the present invention along its longitudinal axis further including a fragmentary representation of portions of two vanes extending upwardly at an angle to the plane of the cross section;

FIGURE 2 is a cross-sectional view taken on the line 2—2 of FIGURE 1; and

FIGURE 3 is a fragmentary cross-sectional view taken along the line 3—3 of FIGURE 1.

In the illustrated embodiment of the invention, there is shown a flanged housing 8 having a wall forming a fluid passageway 10 which is counterbored as at 12 to define a shoulder 14 adjacent to the inlet end thereof. A fluid straightener assembly 16 has a shaft 18 in which a plurality (representatively 6) of radially extending vanes 20 are staked at grooves 22 which extend throughout the longitudinal length of the shaft 18.

The straightener assembly 16 is secured within the housing by staking vanes 20 in grooves 23 in counterbore 12 and by a snap ring 24 seated in an annular groove 26 in the housing 8 which abuts against the ends of vanes 20 or in any other suitable manner.

A fluid flow diverter guide 27 is located at the downstream end of shaft 18 and has a hub portion 28 attached thereon. Hub portion 28 is provided to prevent the fluid flow from striking a rotor 30 thereby creating an end thrust thereon, as well as to increase the flow velocity and to direct fluid flow to the rotor 30 along passageway 34. The hub portion 28 is tapered as a smooth transition to prevent turbulence which would otherwise occur in the vicinity of rotor 30.

Since hub portion 28 is tapered in an outward direction fluid flow at high velocities will have a substantial radial component which tends to cause the fluid flow to pass radially outward so as to strike only the top portions of rotor blades 36. Therefore, a shroud 38 is connected at the downstream end of vanes 20 to redirect the fluid flow so that it is primarily longitudinal at the rotor vane blades 36 and uniform throughout the whole radial length of rotor blade 36. Shroud 38 has a chamfered portion 40 at both ends to provide a smooth transition of flow in the inlet and outlet thereof.

Rotor 30 is supported for rotation about the longitudinal axis of a shaft 42 by means including a ball bearing 44, the outer race of which is attached to rotor 30 by snap-rings 46 and 48 which lock in the hub of rotor 30. A hub 50 of generally conoidal shape is mounted on the downstream end of shaft 42 and has a shoulder 52 which is in axial abutment with the inner race of ball bearing 44 to prevent rotor 30 from striking hub 50. The streamlined conoidal shape provides a smooth transition between differing flow cross-sectional areas to avoid inducing turbulence therein. A spring 54 is mounted between hub portion 28 and the inner race of ball bearing 44 to bias bearing 44 against hub 50 and thereby prevent floating of bearing 44 along shaft 42. A snap-spring 55 locks the downstream hub 50 to shaft 42.

Since the tips of the blades 36 on small diameter rotor 30 are spaced a substantial distance from the wall of housing 8, the reluctance of the magnetic sensing circuit which periodically includes those blades may be so large that the change in reluctance by movement of a blade into alignment with the sensing device 56 may not be sufficient to produce a fully satisfactory electrical output signal.

In accordance with certain of the principles of the present invention, means in the form of a slug 58 of low reluctance material disposed within the large bore passageway 10 reduces the reluctance of the flux path between the rotor blade 36 and the sensing device 56. "Low reluctance" is intended to mean material having a reluctance lower than the space in which the material is located. The slug 58 is firmly staked to an extended portion 60 on one of the straightener vanes 20. In many cases, it is desirable to manufacture flowmetering devices of the noted nature of a material which will resist corrosion, such as stainless steel, and it has been found that the reluctance of the magnetic circuit may be adequately reduced even if slug 58 is manufactured of a magnetic stainless steel.

In the operation of the device, vanes 20 of the flow straightener assembly 16 straighten and guide the flow of fluid through housing 8. Such blades do not have to be absolutely straight and could induce a rotational component to the flow since their function is to insure that the upstream direction of the fluid flow is constant.

As shown in the illustrated embodiment of the invention, the overall rotor diameter is about 75% of the bore diameter in passageway 10. Such relative relationships are merely representative of the inventive concept and even greater disparities are contemplated within the scope of the invention.

While it will be appreciated that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A flowmeter comprising a wall forming a housing having a fluid passageway therein, rotor means rotatably mounted in said fluid passageway having a central body portion and a plurality of blades thereon, diverter means upstream of said rotor means for diverting a substantial portion of the fluid in said fluid passageway to include diverting the fluid flow from said body portion, annular, thin walled shroud means having at least a portion thereof upstream of said rotor means and downstream of at least a portion of said diverter means for redirecting the fluid flow from said diverter means in a direction primarily parallel to the longitudinal axis of said fluid passageway in the vicinity of said rotor means and means supporting said shroud means adjacent an extremity of said blades and radially spaced from said wall whereby fluid flows both through said shroud means and between said shroud means and the wall of said housing.

2. A flowmeter comprising a housing having a wall forming a fluid passageway therein, rotor means having a diameter substantially less than the diameter of said fluid passageway rotatably mounted therein, diverter means upstream of said rotor means for diverting a substantial portion of the fluid flow to the vicinity of said rotor means, annular, thin walled shroud means for redirecting the fluid flow from said diverter means in a substantially longitudinal direction at said rotor means, means supporting said shroud means adjacent an extremity of said blades and radially spaced from said wall whereby fluid flows both through said shroud means and between said shroud means and the wall of said housing and straightener means located upstream of said diverter means for insuring that the direction of fluid flow is constant throughout the upstream portion of said fluid passageway.

3. A flowmeter for association with an electromagnetic sensing device comprising a housing having a fluid passageway therein, rotor means rotatably mounted in said wall forming a fluid passageway having a central body portion and a plurality of blades thereon disposable at times in magnetic circuit with the sensing device, diverter means upstream of said rotor means for directing a substantial portion of the fluid in said fluid passageway to include diverting the fluid flow from said body portion, annular, thin walled shroud means for redirecting the flow through said diverter means in a substantially longitudinal direction in the vicinity of said rotor means, means supporting said shroud means adjacent an extremity of said blades and radially spaced from said wall whereby fluid flows both through said shroud means and between said shroud means and the wall of said housing and means disposed between the wall of said fluid passageway and said rotor blades for reducing the reluctance of the magnetic path between the wall of said fluid passageway and said rotor blades.

4. A flowmeter for association with an electromagnetic sensing device comprising a housing having a wall forming a fluid passageway therein, a rotor rotatably mounted in said fluid passageway having blades thereon with a diameter substantially less than the diameter of said fluid passageway and disposable at times in magnetic circuit with the sensing device, a tapered hub in said fluid passageway upstream of said rotor for directing a substantial portion of the fluid to said rotor, annular, thin walled shroud means for redirecting the fluid flow from said hub in a substantially longitudinal direction in the vicinity of said rotor, means supporting said shroud means adjacent an extremity of said blades and radially spaced from said wall whereby fluid flows both through said shroud means and between said shroud means and the wall of said housing and means disposed between the wall of said fluid passageway and said rotor for reducing the reluctance of the magnetic path between the wall of said fluid passageway and said rotor blades.

5. A flowmeter for association with an electromagnetic sensing device comprising a housing having a wall forming a fluid passageway therein, a small diameter rotor rotatably mounted in said fluid passageway having blades thereon spaced from the wall of said fluid passageway one-quarter of its radius or more and disposable at times in magnetic circuit with the sensing device, diverter means upstream of said rotor for directing a substantial portion of the fluid flow to said rotor, annular, thin walled shroud means for redirecting the fluid flow from said diverter means in a substantially longitudinal direction in the vicinity of said rotor, means supporting said shroud means adjacent an extremity of said blades and radially spaced from said wall whereby fluid flows both through said shroud means and between said shroud means and the wall of said housing and a slug in said fluid passageway between the wall of said fluid passageway and said small diameter rotor for reducing the reluctance of the magnetic path between the wall of said fluid passageway and said rotor blades.

6. A flowmeter for association with an electromagnetic sensing device comprising a housing having a wall forming a fluid passageway therein, a small diameter rotor rotatably mounted in said fluid passageway having blades thereon spaced from the wall of said fluid passageway by one-quarter of its radius or more and disposable at times in magnetic circuit with the sensing device, a tapered hub in said fluid passageway for diverting a substantial portion of the fluid flow to said small diameter rotor, annular, thin walled shroud means for redirecting the fluid flow from said tapered hub to a substantially longitudinal direction in the vicinity of said rotor, means supporting said shroud means adjacent an extremity of said blades and radially spaced from said wall whereby fluid flows both through said shroud means and between said shroud means and the wall of said housing and a slug of stainless steel disposed between the wall of said fluid passageway and said small diameter rotor for reducing the reluctance of the magnetic path between the wall of said fluid passageway and said rotor.

7. A flowmeter for association with an electromagnetic sensing device comprising a housing having a wall forming a fluid passageway therein, a small diameter rotor rotatably mounted in said fluid passageway having a plurality of blades thereon disposable at times in magnetic circuit with the sensing device and with tips spaced from the wall of said fluid passageway by one-quarter of its radius or more, a tapered hub in said fluid passageway upstream of said rotor for directing a substantial portion of the fluid flow to said rotor, an annular thin walled shroud mounted concentric with said hub for redirecting the fluid flow from said hub to a substantially longitudinal direction in the vicinity of said small diameter rotor, straightener means in said fluid passageway for directing the fluid flow in a constant direction upstream of said tapered hub, means supporting said shroud means adjacent an extremity of said blades and radially spaced from said wall whereby fluid flows both through said shroud means and between said shroud means and the wall of said housing and means disposed between the wall of said fluid passageway and the tips of said rotor blades for reducing the reluctance of the magnetic path between the wall of said fluid passageway and the tips of said rotor blades.

8. A flowmeter for association with an electromagnetic sensing device comprising a housing having a fluid passageway therein, a rotor rotatably mounted therein having blades thereon disposed at times in magnetic circuit with the sensing device and with tips spaced from the wall of said fluid passageway by one-quarter of its radius or more, a tapered hub in said fluid passageway upstream of said rotor for directing fluid flow to said rotor, a ring shroud located between the wall of said fluid passageway and the tips of said blades and having at least a portion thereof upstream of said rotor means and downstream of at least a portion of said hub to redirect the fluid flow from said hub to a substantially longitudinal direction in the vicinity of said rotor, a plurality of straight vanes in said fluid passageway for directing the fluid flow in a constant direction upstream of said tapered hub, a shaft in said fluid passageway connected to the radially innermost edges of said vanes and the radially outermost edges of said vanes contacting the wall of said fluid passageway, said shaft supporting said tapered hub and said rotor, one of said straight vanes having a portion extending between the wall of said fluid passageway and said ring shroud to a point adjacent said rotor, a slug of material mounted on said extended portion contacting the wall of said fluid passageway and extending to a point immediately adjacent the tip of said rotor blades for reducing the reluctance of the magnetic path between the wall of said fluid passageway and the tips of said rotor blades.

References Cited in the file of this patent
UNITED STATES PATENTS

| | | |
|---|---|---|
| 2,709,755 | Potter | May 31, 1955 |

FOREIGN PATENTS

| | | |
|---|---|---|
| 752,496 | Great Britain | July 11, 1956 |
| 804,333 | Great Britain | Nov. 12, 1958 |